US008052103B2

(12) United States Patent
Ferraro et al.

(10) Patent No.: US 8,052,103 B2
(45) Date of Patent: Nov. 8, 2011

(54) WEDGE SUPPORT FOR THE DISPLAY OF PLANAR PRODUCTS

(75) Inventors: Brandon R. Ferraro, St. Louis Park, MN (US); Alexander D. Ellendson, Minneapolis, MN (US); Timothy M. Magner, Champlin, MN (US)

(73) Assignee: Target Brands, Inc., Minneapolis, MN (US)

( * ) Notice: Subject to any disclaimer, the term of this patent is extended or adjusted under 35 U.S.C. 154(b) by 228 days.

(21) Appl. No.: 12/394,932

(22) Filed: Feb. 27, 2009

(65) Prior Publication Data

US 2010/0219318 A1 Sep. 2, 2010

(51) Int. Cl.
*F16M 11/00* (2006.01)
*G09F 1/00* (2006.01)

(52) U.S. Cl. ..................... 248/174; 248/459; 40/124.09; 40/124.19

(58) Field of Classification Search .................. 248/473, 248/459, 460, 174, 463, 346.3; 206/308.1, 206/309, 312, 425, 764, 45.24; 40/124.16, 40/124.19, 539, 610, 750, 124.01, 124.09
See application file for complete search history.

(56) References Cited

U.S. PATENT DOCUMENTS 2,142,826 A 1/1939 Rosello
2,311,218 A 2/1943 Fandrich
2,449,911 A 9/1948 Roth
2,472,166 A 6/1949 Mathewson
2,530,950 A * 11/1950 Ebert et al. ................. 40/124.09
2,720,046 A * 10/1955 Decker ...................... 40/124.19
2,975,905 A 3/1961 Foland
3,057,470 A 10/1962 Heiber
3,763,583 A * 10/1973 Gregg ....................... 40/124.19
5,390,437 A * 2/1995 Pearson ......................... 40/661
5,641,063 A 6/1997 Gambardella et al.
5,711,101 A * 1/1998 Mueller et al. ................. 40/750
5,732,491 A 3/1998 Burtch
D398,429 S 9/1998 LeBlanc et al.
5,901,844 A 5/1999 Gambardella et al.
6,059,101 A 5/2000 Gambardella et al.
6,505,737 B1 1/2003 Sherman
6,637,594 B1 10/2003 Bucknell
6,799,678 B2 * 10/2004 Sherman .................... 206/308.1

* cited by examiner

*Primary Examiner* — Tan Le
(74) *Attorney, Agent, or Firm* — Griffiths & Seaton PLLC

(57) ABSTRACT

A product assembly includes a substantially planar product and a support wedge. The support wedge is formed separately from the substantially planar product and includes a base, two sidewalls, and two internal walls. The two sidewalls each extend from opposite sides of the base and converge toward one another as they extend away from the base. The two internal walls each extend from a side of one of the two sidewalls opposite the base. The two internal walls are substantially parallel to and spaced from one another to define a slot between the two internal walls. The substantially planar product is positioned within the slot and is held in place due to compression applied to the substantially planar product by the two internal walls. Other products, assemblies, and associated methods are also disclosed.

22 Claims, 8 Drawing Sheets

WEDGE SUPPORT FOR THE DISPLAY OF PLANAR PRODUCTS

BACKGROUND OF THE INVENTION

Retailers are continually evolving product displays in hopes of discovering more effective and visually attractive means for displaying products to potential consumers. The retail display of artwork, for example, signs, paintings, photographs, etc., offered for retail sale presents specific challenges since the planar nature of the artwork provides no edge surface sufficient to independently support the artwork on a display shelf or other horizontal fixture. Consequently, planar artwork is typically displayed for retail sale hanging from a support rod or in a flip-stack grouping.

SUMMARY OF THE INVENTION

One aspect of the present invention relates to a product assembly including a substantially planar product and a support wedge. The support wedge is formed separately from the substantially planar product and includes a base, two sidewalls, and two internal walls. The two sidewalls each extend from opposite sides of the base and converge toward one another as they extend away from the base. The two internal walls each extend from a side of one of the two sidewalls opposite the base. The two internal walls are substantially parallel to and spaced from one another to define a slot between the two internal walls. The substantially planar product is positioned within the slot and is held in place due to compression applied to the substantially planar product by the two internal walls. Other related products, assemblies and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Embodiments of the present invention are configured to display a substantially planar product in a retail display, for example, on a shelf or other horizontal support surface. More specifically, a wedge support maintains the planar product in a substantially vertical orientation and provides a horizontal, planar panel for interacting with the horizontal support surface of the separate retail display. As a result, planar products are displayed extending in a vertical orientation from a horizontal shelf without requiring specific fixture components to be coupled to or otherwise provided with the horizontal support surface. Use of the wedge support lowers retailer costs since specialized fixtures do not need to be purchased to effectuate vertical display of substantially planar products. In addition, fewer man-hours are generally required to place the products for retail display since auxiliary fixtures do not need to be located and installed prior to placement of the products on the retail display.

Figure 1:
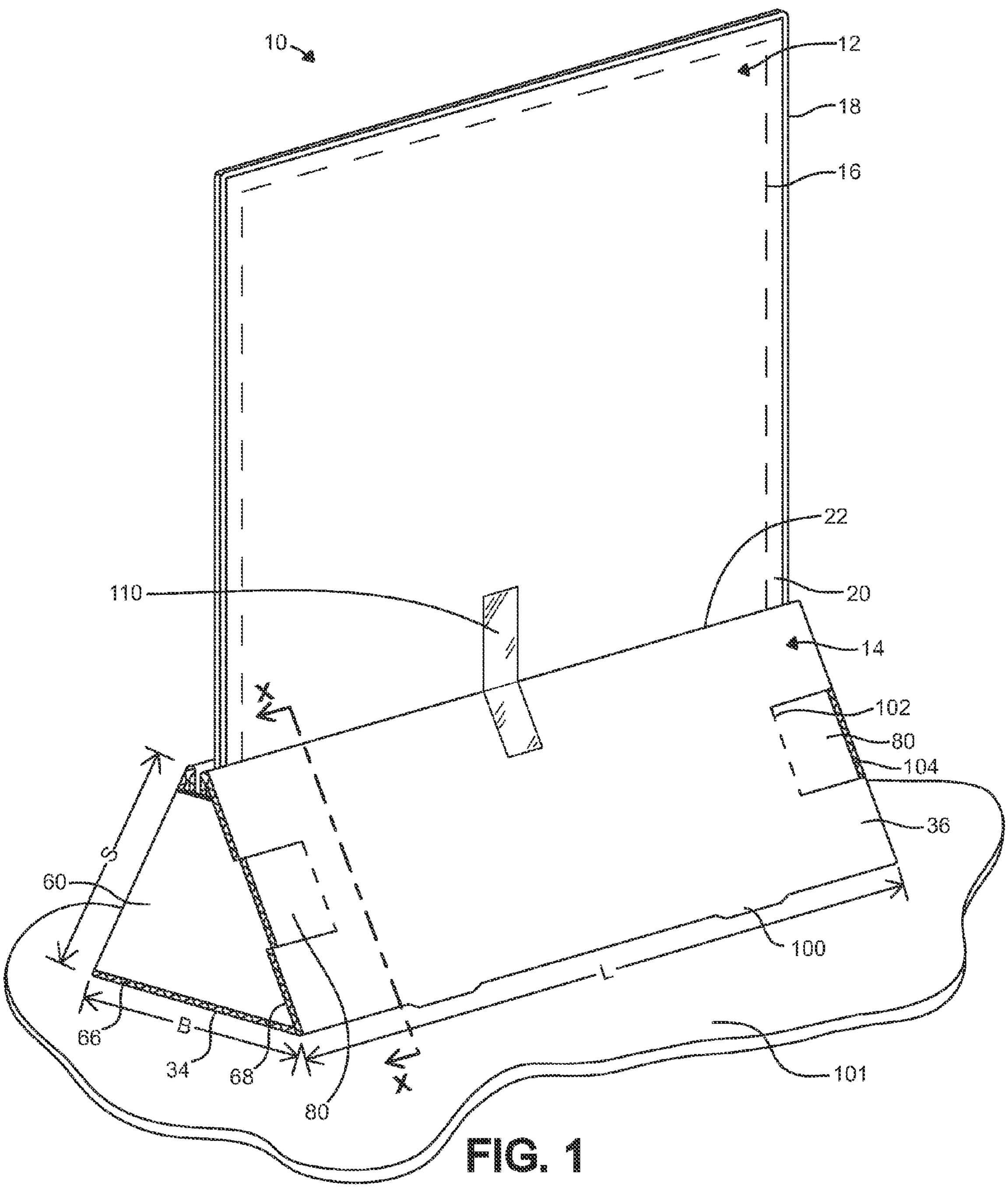
FIG. 1 is a front, perspective view illustrating a product display assembly including a planar product and a wedge support, according to one embodiment of the present invention.

Turning to FIG. 1, a retail product assembly 10 including a substantially planar product 12 and a wedge support 14 (or support wedge) are illustrated according to one embodiment of the invention. Product 12 is any substantially planar item such as a poster, artwork, photograph, sign, map, etc. and, in one example, is configured for retail sale. In one example, product 12 includes indicia 16 as generally indicated with dashed lines in FIG. 1 for illustrative clarity. Indicia 16 include any suitable images or demarcations formed with paint, ink, etc. Product 12 is generally supported by wedge support 14 in a manner maintaining at least a substantial portion of indicia 16 to be readily viewable when product 12 is part of product assembly 10. Readily viewing indicia 16 facilitates a potential consumer in deciding whether to purchase and/or which one of a plurality of products 12 to purchase.

In one embodiment, product 12 is formed of a material (e.g., metal, cardboard, paperboard, plastic or composite) having sufficient rigidity to maintain its planarity when held in a vertical orientation. In one embodiment, product 12 is formed of a material (e.g., metal, cardboard, paperboard, plastic or composite) with relatively less rigidity such that product 12 would curl, fold, or otherwise wilt when held in a vertical orientation. In one example, where product 12 does not have sufficient rigidity to maintain its planarity when held in a vertical orientation, a support member 18 is attached to the product 12 to provide additional rigidity. Support member 18 is formed of a sufficiently rigid material (e.g., metal, cardboard, paperboard, plastic, or composite) and is substantially planar. In one example, a separate product 12 may be attached to each side of support member 18, for instance, where the two products 12 are offered for retail sale as a pair or set. Product(s) 12 may be coupled to support member 18 with an adhesive, shrink-wrap, tape, staple, or other suitable method or combination of methods. While illustrated as being slightly smaller than support member 18 for illustrative purposes, it should be understood that in one embodiment, support member 18 is substantially coextensive with product 12.

Wedge support 14 is configured to interface with a lower portion 20 of product 12 alone or with support member 18 to hold product 12 in a vertical orientation. In one example, wedge support 14 is formed entirely separately from product(s) 12 and support member 18. When erected or fully assembled, wedge support 14 is substantially shaped as a triangular prism, and product 12 is at least partially maintained within wedge support 14 to vertically extend out an upper edge 22 of wedge support 14.

Figure 4:
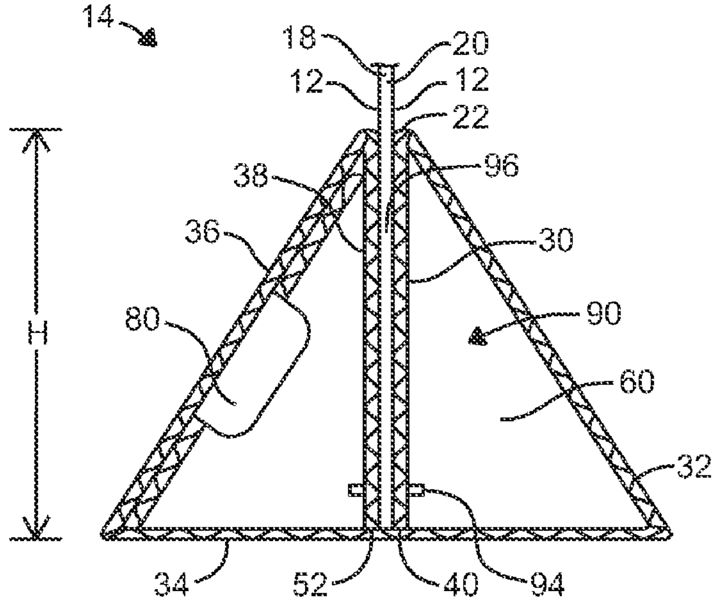
FIG. 4 is a cross-sectional view of the product display assembly taken along the line X-X in FIG. 1, according to one embodiment of the present invention.

Wedge support 14 defines a body length L, a base length B, a side length S, and a height H as indicated with additional reference to FIG. 4. In one embodiment, the particular values of body length L, base length B, side length S, and height H are generally dependent upon the size and shape of product(s) 12 being supported. For example, base length B and height H generally proportionately increase with an overall height of products(s) 12 in order to decrease the likelihood that product assembly 10 will tip or topple over when supported on horizontal surface 101. In one example, a particular size of wedge support 14 is configured for use with a range of sizes of product 12 such that base length B and height H may be oversized in comparison to the height of product(s) 12 as will be apparent to those of skill in the art upon reading the present application.

Figure 2:
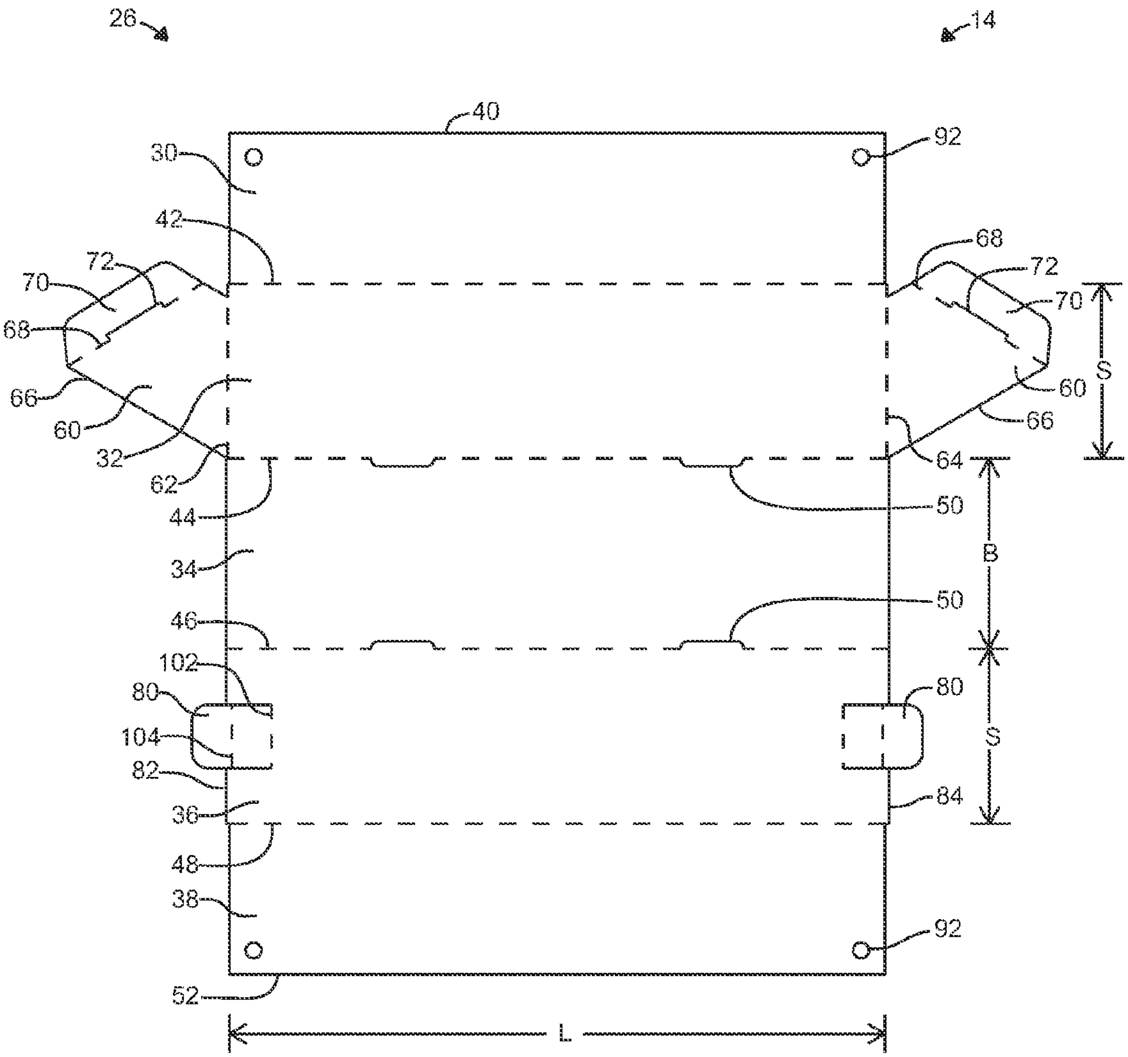
FIG. 2 is a top view illustrating the wedge support of FIG. 1 in an unfolded state, according to one embodiment of the present invention.

Referring to FIG. 2, in one embodiment, wedge support 14 is formed from a single blank 26 of a planar material (e.g., cardboard, paperboard, plastic, metal or a composite). In one embodiment, blank 26 defines five substantially rectangular sections each extending longitudinally and positioned laterally adjacent at least one of the other five sections. In one embodiment, first section is a first internal or product interface wall 30. The second section is a first sidewall 32 laterally extending from a longitudinal edge of first internal wall 30. Third section is a base 34 laterally extending from longitudinal edge of first sidewall 32 away from first internal wall 30. Fourth section is a second sidewall 36 laterally extending from a longitudinal edge of base 34 in a direction opposite first sidewall 32. Finally, fifth section is a second internal or product interface wall 38 laterally extending from a longitudinal edge of second sidewall 36 in a direction opposite base 34.

First internal wall 30 defines a free longitudinally extending edge 40 opposite first sidewall 32. Fold lines 42, 44, 46, and 48, which are generally indicated with dashed lines in FIG. 2, are respectively formed at the boundary lines between adjacent ones of first internal wall 30, first sidewall 32, base 34, second sidewall 36, and second internal wall 38. As such, fold lines 42, 44, 46, and 48 each extend longitudinally and are laterally spaced from one another. Second internal wall 38 defines a free longitudinally extending edge 52 opposite fold line 48. In one embodiment, shallow, substantially U-shaped slits 50 are formed to extend from each of fold lines 44, 46 into base 34 from each of fold lines 44, 46 as will be further described below.

In one embodiment, an end wall 60 extends from each of opposite lateral ends 62, 64 of first sidewall 32. Each end wall 60 is substantially triangular and defines a free edge 66 substantially extending from fold line 44 and a fold line 68 extending from an end of free edge 66 opposite fold line 44. Fold line 68 converges in a general direction toward fold line 42. In one example, resulting end wall 60 is defined between one of lateral ends 62 or 64, free edge 66, and fold line 68 and is substantially triangular. A flange 70 is formed to extend from fold line 68 away from a remainder of the corresponding end wall 60. A slit 72 is defined along or near fold line 68, for example, along a center length of fold line 68.

In one example, a tab 80 is defined and extends from each of opposite lateral edges 82, 84 of second sidewall 36. In one example, each tab 80 is formed partially within a body of second sidewall 36 and extends longitudinally beyond the respective lateral edge 82, 84 of second sidewall 36. In one embodiment, an inside edge of each tab 80 is defined by a fold line 102. Another fold line 104 is defined between fold line 102 and an opposite outside edge of tab 80. In one example, fold line 104 is slightly longitudinally offset toward inside of second sidewall 36 as compared to the corresponding lateral edge 82, 84. Although end walls 60 and tabs 80 are primarily described as extending from first sidewall 32 and second sidewall 36, respectively, end walls 60 may alternatively extend from second sidewall 36 and tabs 80 may alternatively extend from first sidewall 32 as will be apparent to those of skill in the art upon reading this application.

When folding or erecting wedge support 14, blank 26 is folded out of the page as illustrated in FIG. 2 about base 34. More specifically, first and second sidewalls 32, 36 are folded about fold lines 44, 46, respectively, toward one another to at least partially erect wedge support 14 as illustrated with additional reference to FIGS. 3 and 4. When erected, base 34 and sidewalls 32, 36 collectively define an outer body of the wedge support 14 with an interior compartment 90 formed therein. Internal walls 30, 38 are folded about fold lines 42, 48 to extend into interior compartment 90. In one example, once wedge support 14 is erected, wedge support 14 is formed in a substantially triangular prismatic shape. Once so folded, as illustrated with additional reference to FIG. 3, internal walls 30, 38 extend substantially parallel to one another.

Figure 3:
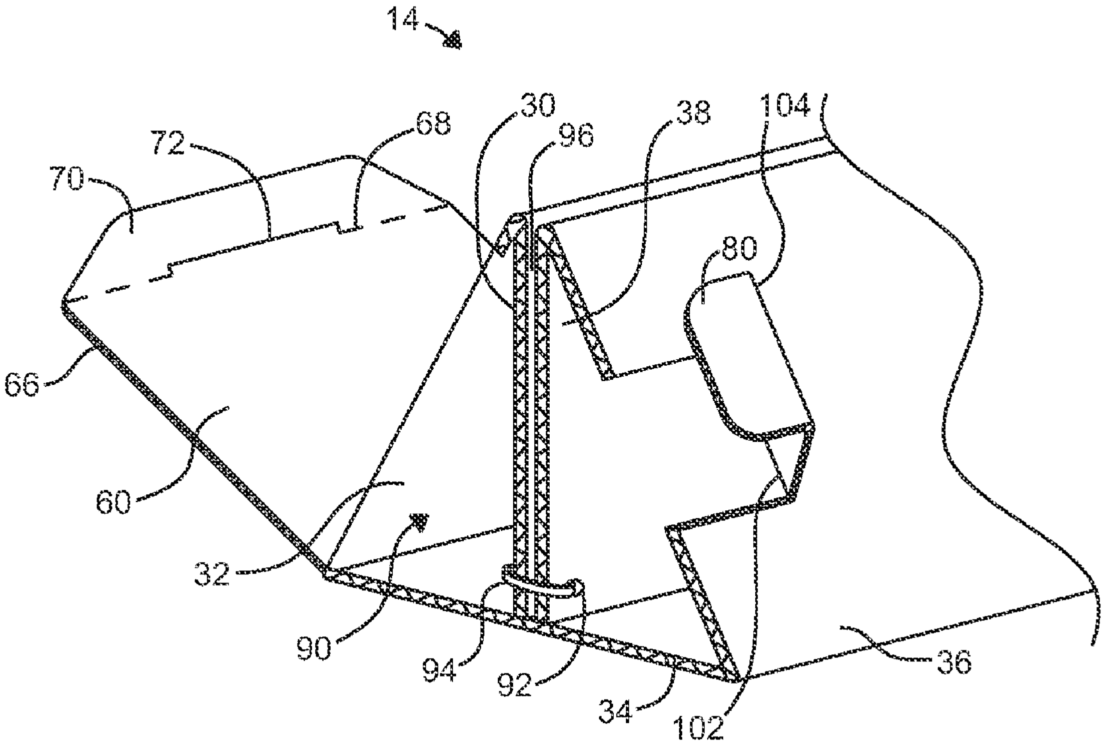
FIG. 3 is a front perspective view illustrating a partially unfolded portion of the wedge support of FIG. 1, according to one embodiment of the present invention.

Referring to FIGS. 3 and 4, in one embodiment, in order to maintain wedge support 14 in an erected position, internal walls 30, 38 each include an aperture 92 near a lower corner thereof defined near lateral ends of internal walls 30, 38 and free edges 40, 52, respectively. In one example, once blank 26 is folded, a connector 94 is placed through adjacent apertures 92 in first and second internal walls 30, 38 to maintain internal walls 30, 38 near each other. In one embodiment, connector 94 is a cable tie, wire tie, string, or other suitable connecting member configured to fit through apertures 92. In another embodiment, connector 94 is configured for use without predefined apertures 92, such as a rivet, staple, etc. While connector 94 may be coupled to wedge support 14 before placement of product(s) 12 and/or support member 18 in slot 96, in one example, such as where product(s) 12 include corresponding apertures (not shown), product(s) 12 may be placed in slot 96 as will be further described below, and connector 94 may extend not only through apertures 92 of internal walls 30, 38 but also through apertures in the corresponding product(s) 12 and/or support member 18.

When assembled and held near to, but not tightly abutting each other, internal walls 30, 38 define a slot 96 therebetween (e.g., in the form of a rectangular cavity) with a width that is similar to but slightly less than an overall thickness of product 12(s) and any supporting member 18. In one embodiment, slot 96 substantially along an entire length of sidewalls 32, 36 and/or base 34 of wedge support 14. In one example, slot 96 extends from top or upper edge 22 of wedge support 14 to base 34 and/or is bordered on either side by one of internal walls 30, 38.

In one embodiment, when blank 26 is folded along fold lines 44, 46, feet 100 (FIG. 1) are defined by each sidewall 32, 36 due to the shape of slits 50 described above with respect to FIG. 2. Therefore, each foot 100 extends in the same plane as the respective defining sidewall 32, 36. In one example, each foot 100 extends just slightly below base 34 such that when wedge support 14 is placed on a horizontal support surface 101 (FIG. 1), such as a retail display shelf, each foot 100 contacts horizontal support surface 101 in a manner stabilizing wedge support 14 by both decreasing undesired sliding of product assembly 10 over horizontal support surface 101 and by generally decreasing the likelihood that product assembly 10 will rock or tip over in the lateral direction. As will be apparent to those of skill in the art, the size of wedge support 14 as a whole (e.g., including length L, base width B, and sidewall length S) is also sized or scaled based on the overall size and, in particular, the height of product 12 to further stabilize product assembly 10 as a whole when placed on the supporting horizontal surface 101.

Once base 34, sidewalls 32, 36, and internal walls 30, 38 are folded to define the triangular cross-section of wedge support 14 and slot 96, end walls 60 are folded into place as illustrated, for example, with reference to FIGS. 1 and 3. More specifically, each end wall 60 is folded about corresponding end 62, 64, which, in one example, are define fold lines, toward the opposite end wall 60. A shown in FIG. 2, in one embodiment, internal walls 30, 38 have a slightly smaller length than base 34 and sidewalls 32, 36 so internal walls 30, 38 do not block positioning of end walls 60 when folded to extend between sidewalls 32, 36.

In one embodiment, flange 70 is folded along fold line 68 to extend in a direction substantially perpendicular to end wall 60 and into interior compartment 90 just inside sidewall 36. When end walls 60 are folded into place, slit 72 is positioned near one of tabs 80 defined by sidewall 36. Each tab 80 is first rotated outwardly away from a remainder of sidewall 36 along first tab fold line 102 as generally indicated in FIG. 3, and is folded along second tab fold line 104 in an opposite direction. Subsequently, tab 80 is rotated along first tab fold line 102 toward the corresponding end wall 60 until tab 80 enters interior compartment 90 through slit 72 defined between end wall 60 and flange 70. As such, tab 80 effectively holds end wall 60 in place and/or facilitates maintenance of sidewalls 32, 36 and internal walls 30, 38 in position relative to one another. In one embodiment, when end wall 60 is in place it extends substantially perpendicularly to each of sidewalls 32, 36 and internal walls 30, 38.

Once wedge support 14 is assembled it is configured to support product(s) 12 and any support member 18 by pinching or otherwise compressing product(s) 12 and any support member 18 between internal walls 30, 38. If not positioned during assembly of wedge support 14, then, following assembly of wedge support 14, product(s) 12 and any support member 18 are slid in the vertical direction down into slot 96 (and, in one example, internal compartment 90). Due to the angular orientation of sidewalls 32, 36, the relatively narrow width of slot 96, and/or inclusion of connector 94, internal walls 30, 38 are tightly held against opposite sides of product(s) 12 and any support member 18 such that product(s) 12 and any support member 18 are securely held therebetween via compression.

In one embodiment, product(s) 12 are slightly smaller in length (i.e., in the longitudinal direction) than length L of wedge support 14 so product(s) fit within compartment 90 between connectors 94. In one embodiment, product(s) 12 are substantially similar in length as compared to length L of wedge support 14 such as where no connectors 94 are used or where product(s) 12 have apertures corresponding with the position of apertures 92 of wedge support 14 as will be apparent to those of skill in the art upon reading the present application.

Figure 5:
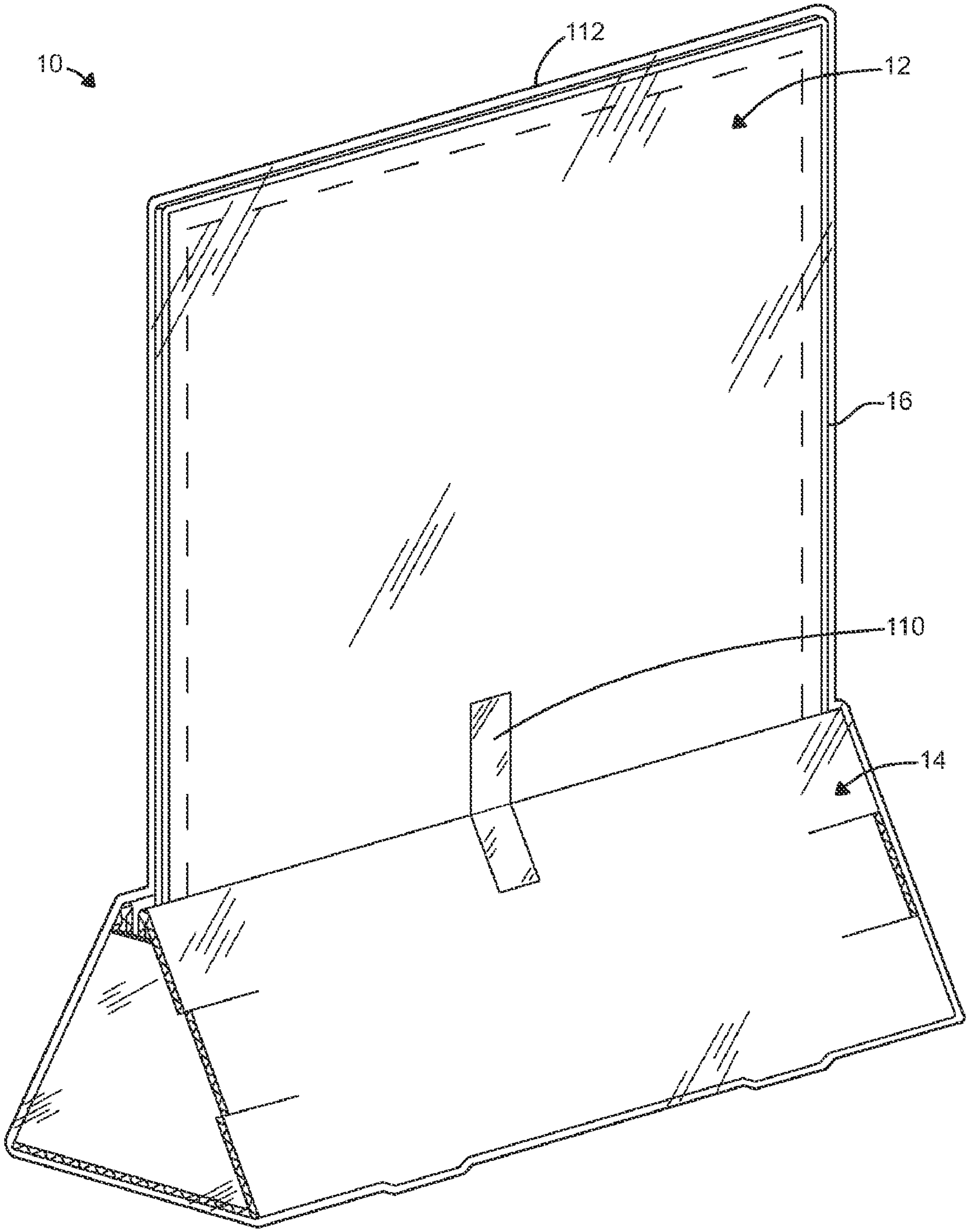
FIG. 5 is a front perspective view of the product display assembly of FIG. 1 with a transparent wrap, according to one embodiment of the present invention.

In one embodiment, tape 110 or other securing means is additionally placed on wedge support 14, product(s) 12, and/or any support member 18 to further secure the items in place relative to one another. In one embodiment, tape 110 or other securing means is only supplemental to sign wedge compression in maintaining product(s) 12 in place relative to wedge support 14. In one embodiment, to protect product assembly 10, product assembly 10 includes shrink wrap, cellophane or other translucent or transparent wrap 112 as generally illustrated in FIG. 5 extending around wedge support 14 and products(s) 12. Transparent wrap 112 further secures product assembly 10 and protects the remainder of product assembly 10 from dirt and other contaminates.

Figure 6:
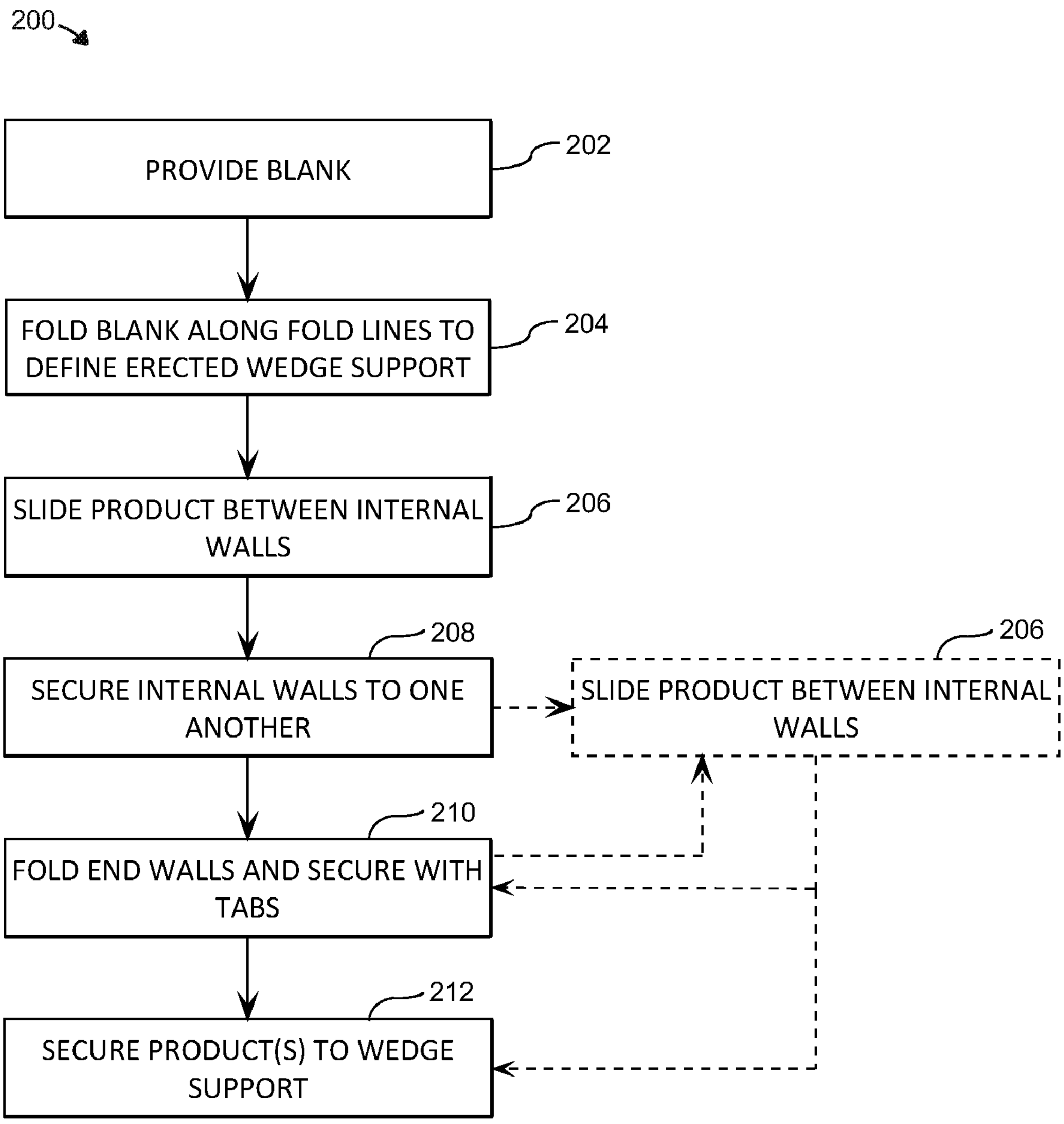
FIG. 6 is a flow chart illustrating a method of forming and displaying a product display assembly, according to one embodiment of the present invention.

FIG. 6 is a flow chart generally illustrating a method 200 of forming product assembly 10 according to one embodiment of the present invention. At 202, blank 26 is provided, for example, formed of a planar piece of corrugated cardboard. At 204, blank 26 is folded along fold lines 42, 44, 46, and 48 around base 34 to define an erected wedge support 14 with a substantially triangular prism shape. In one embodiment, at 206, product(s) 12 and/or support member 18 are slid into slot 96 between internal walls 30, 38. Then, in one example, at 208, internal walls 30, 38 are secured to one another in any suitable connection device such as connectors 94 through apertures 92.

At 210, end walls 60 are folded about fold lines defined at ends 62, 64 to fit between sidewalls 32, 36. In one example, end walls 60 are secured in place by placing each tab 80 through a corresponding slit 72 in an adjacent end wall 60. Finally, at 212, product(s) 12 are secured to wedge support 14 via tape 110 or other connector and/or transparent wrap 112. Once product assembly 10 is formed, it can easily be placed on a retail display support shelf 101 to display product(s) 12 in a vertical, easily viewed orientation. As such, the simple support shelf 101 without need for additional fixtures to support product(s) 12 is sufficient for supporting product(s) 12 in an aesthetically pleasing manner easily accessible by potential consumers.

Method 200 is one example of assembling product assembly 10 and variations will be apparent to those of skill in the art upon reading this application. For example, operation 212 may be eliminated. In one example, operation 206 is not completed before operation 208, but rather, is completed after any one of operations 208, 210 as generally indicated in FIG. 6 with dashed lines. In one example, where operation 206 occurs after either of operations 208, 210, sliding product 12 into slot 96 slightly pushes internal walls 30, 38 outwardly such that internal walls 30, 38 apply reactive force toward each other also serve to hold product 12 in place therebetween. Other variations are also contemplated.

Figure 7:
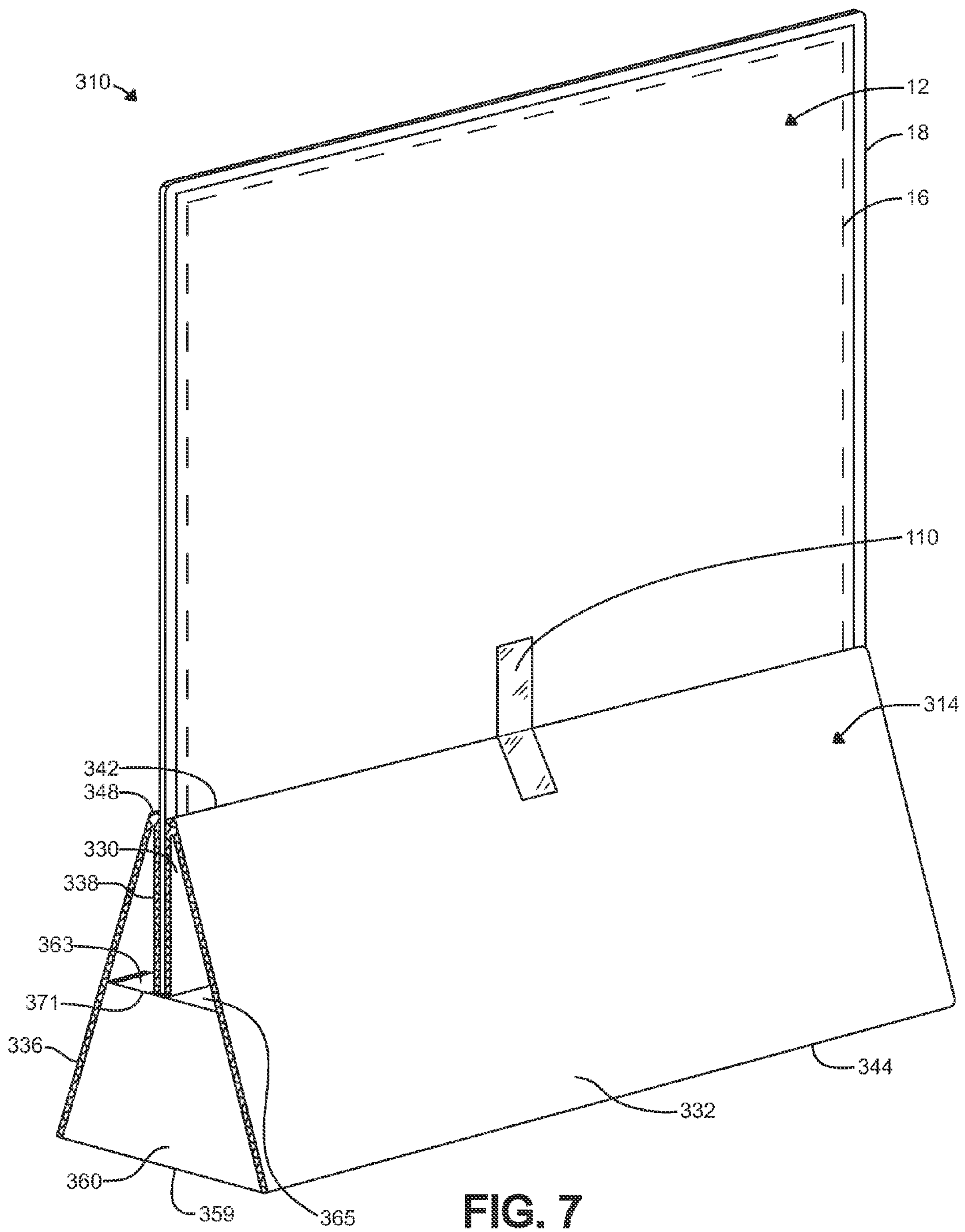
FIG. 7 is a front, perspective view illustrating a product display assembly including a planar product and a wedge support, according to one embodiment of the present invention.
Figure 8:
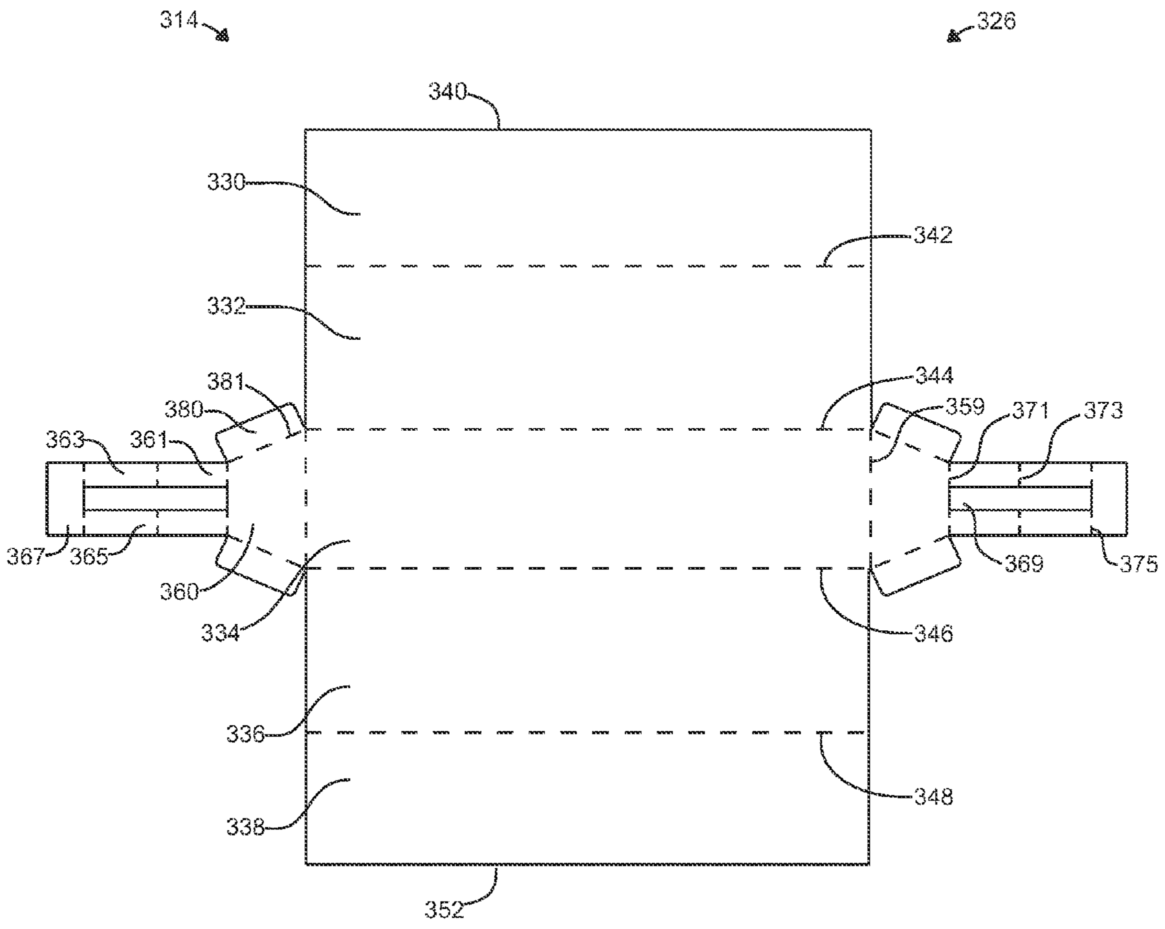
FIG. 8 is a top view illustrating the wedge support of FIG. 7 in an unfolded, non-erected position, according to one embodiment of the present invention.
Figure 9:
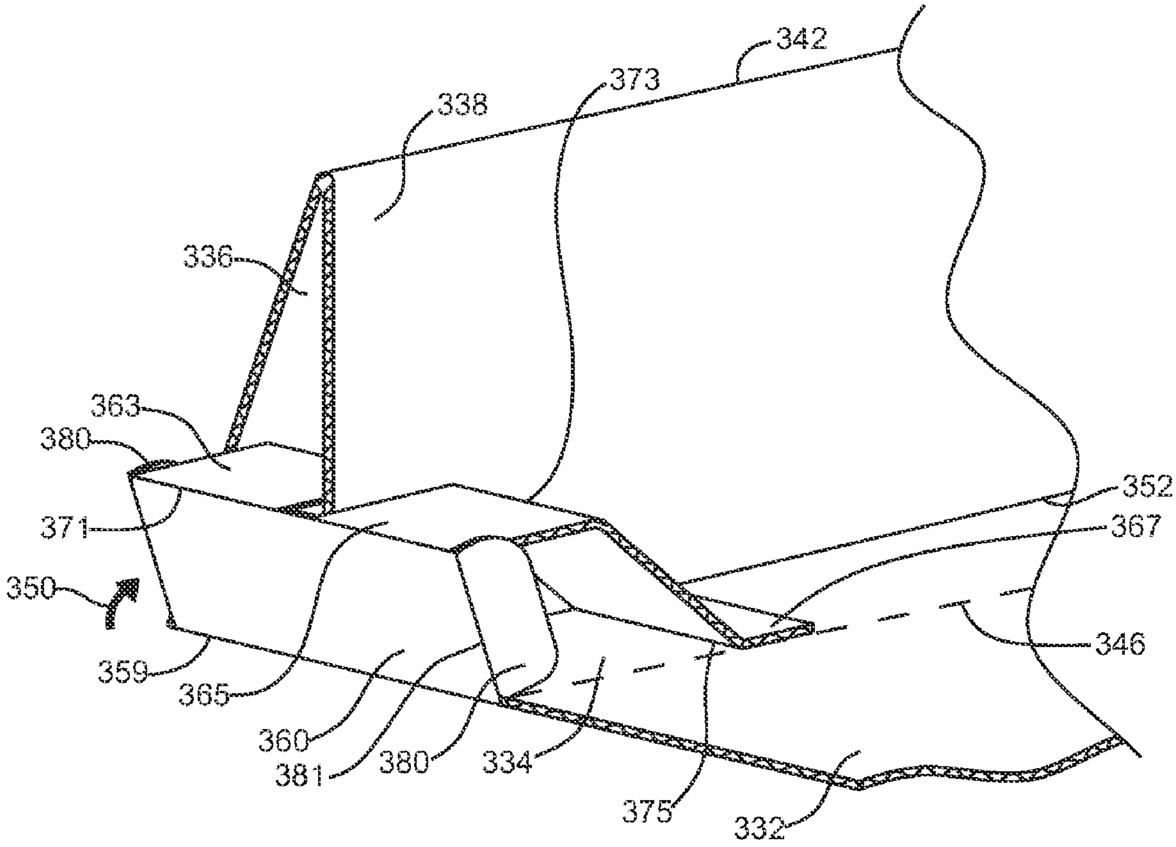
FIG. 9 is a front perspective view illustrating a partially unfolded portion of the wedge support of FIG. 7, according to one embodiment of the present invention.

FIGS. 7-9 illustrate an alternative embodiment of a product assembly 310 including sign/product 12 and a wedge support 314. Wedge support 314 generally functions similar to wedge support 14 (FIGS. 1-4) except where specifically described below. As will be apparent to one of skill in the art upon reading this application, components of wedge supports 14, 314 can be substituted or combined with the components of the other of wedge supports 14, 314 in any suitable manner.

Wedge support 314 is formed from a single blank 326 of material as generally indicated in FIG. 8. Wedge support 314 defines a first internal wall 330, a first sidewall 332, a base 334, a second sidewall 336, and a second internal wall 338 divided from one another by fold lines 342, 344, 346, and 348. First internal wall 330 defines a free edge 340 opposite fold line 342, and second internal wall 338 defines a free edge 352 opposite fold line 348 in a similar manner as described above with respect to wedge support 14. In one embodiment, similar to wedge support 14, blank 326 folds to form wedge support 314 as a substantially triangular prismatic shaped member configured to hold product(s) 12 and any associated support member 18 (FIG. 1) between internal walls 330, 338 using compression.

In one embodiment, an end wall 360 extends outwardly from each opposing lateral end of base 334 and defining a fold line 359. End wall 360 may have any suitable configuration to at least partially, and, in one example, to substantially, cover an end of erected wedge support 314. In one embodiment, end wall 60 is substantially trapezoidal or frustro-triangular and is configured to cover a lower end portion of wedge support 314. Tabs 380 are defined on each side of end wall 360 and are configured to border the respective end wall 360 along fold line 381.

In one embodiment, a fold line 371 is defined at an edge of end wall 360 opposite base 334. In one example, a coupling flange 361 outwardly extends from fold line 371 (i.e., extends away from end wall 360). Coupling flange 361 is segmented into first strap segment 363, second strap segment 365, and lateral segment 367. In one example, first and second strap segments 363, 365 extend parallel to and are spaced from one another away from fold line 371 such that an elongated void or slot 369 is formed therebetween. Lateral segment 367 extends substantially perpendicular to each and between first and second strap segments 363, 365. As such, in one example, slot 369 is defined between end wall 360, first and second strap segments 363, 365, and lateral segment 367.

When erecting blank 326 to define assembled wedge support 314, end wall 360 is folded upwardly relative to base 334 about fold line 359 as generally indicated by arrow 350 in FIG. 9. Coupling flange 361 is folded further inward relative to end wall 360 about fold line 371. In one embodiment, coupling flange 361 is configured such that upon folding sidewalls 332, 336 and internal walls 330, 338 in a similar manner as described with respect to sidewalls 32, 36 and internal walls 30, 38 of wedge support 14, internal walls 330, 338 each fit at least partially within slot 369 as generally indicated with reference to FIG. 9. More specifically, in one embodiment, coupling flange 361 is further folded about a first flange fold line 373 formed about half way along the longitudinally extending length of slot 369 and strap segments 363, 365.

A second flange fold line 375 is formed along the border of lateral segment 367 with each of first and second strap segments 363, 365. When folded into blank 326, flange is folded along flange fold lines 373, 375 such that a portion of each strap segment 363, 365 between fold lines 371, 373 extends substantially perpendicular to end wall 361, and a first portion of each strap segment 373, 375 defined between flange fold lines 373, 375 extends downwardly toward base 334. In one embodiment, lateral segment 367 is folded upwardly along fold line 375 and is configured to extend substantially parallel and directly adjacent to base 334. In one example, tabs 380 are folded inward about the respective fold lines 381.

After coupling flange 361 is erected, sidewalls 332, 336 are folded toward each other about fold lines 344, 346, respectively. Internal walls 330, 338 are folded inwardly and are placed within slot 369 of coupling flange 361 until free edges 340, 352 rest on lateral segments 367. In this manner, internal walls 330, 338 are maintained near each other between longitudinal segments 363, 365. Product(s)12 and/or support member 18 are slid between internal walls 330, 338 and are held in place via compression within slot 369 between internal walls 330, 338. Tape 110, transparent wrap (similar to transparent wrap 112 of FIG. 5, or other item/device may be used to further secure product(s) 12 in place relative to wedge support 314.

Although the invention has been described to particular embodiments, such embodiments are for illustrative purposes only and should not be considered to limit the invention. Various alternatives and modifications within the scope of the invention in its various embodiments will be apparent to those with ordinary skill in the art.

What is claimed is:

1. A product assembly comprising:
a substantially planar product;
a support wedge formed as a single piece of material separate from the substantially planar product and including:
a base,
two sidewalls each extending from opposite sides of the base and converging toward one another as they extend away from the base; and
two internal walls each extending from a side of one of the two sidewalls opposite the base, wherein the two internal walls are substantially parallel to and spaced from one another to define a slot between the two internal walls;
wherein:
the substantially planar product is positioned within the slot and is held in place due to compression applied to the substantially planar product by the two internal walls, and
the substantially planar product includes a substantially linear, bottom-most edge, and the substantially linear, bottom-most edge rests substantially entirely on an interior surface of the base and extends from the support wedge with a substantially vertical orientation.

2. The product assembly of claim 1, wherein each internal wall extends from the base to a top edge of the support wedge opposite the base.

3. The product assembly of claim 1, further comprising:
a support member positioned within the slot and coupled with the substantially planar product to add to a rigidity of the substantially planar product such that the substantially planar product extends substantially vertically from the support wedge.

4. The product assembly of claim 1, further comprising:
an end wall covering at least a portion of an end of the support wedge and extending substantially perpendicularly relative to each of the base, the two sidewalls, and the two internal walls.

5. The product assembly of claim 4, wherein the end wall covers substantially all of the end of the support wedge and is a first end wall, and the product assembly further comprises:
a second end wall covering substantially all of an opposite end of the support wedge.

6. A product assembly comprising:
a substantially planar product;
a support wedge formed separately from the substantially planar product and including:
a base,
two sidewalls each extending from opposite sides of the base and converging toward one another as they extend away from the base;
two internal walls each extending from a side of one of the two sidewalls opposite the base, wherein the two internal walls are substantially parallel to and spaced from one another to define a slot between the two internal walls; and
a end wall covering at least a portion of an end of the support wedge and extending substantially perpendicularly relative to each of the base, the two sidewalls, and the two internal walls;
wherein:
the substantially planar product is positioned within the slot and is held in place due to compression applied to the substantially planar product by the two internal walls,
the end wall is coupled to a first one of the two sidewalls along a fold line,
the end wall defines a slit,
a second one of the two sidewalls defines a coupling tab, and the slit receives the coupling tab to hold the support wedge in an erected position.

7. The product assembly of claim 1, wherein the slot extends along an entire length of each of the two sidewalls.

8. The product assembly of claim 1, wherein each of the two internal walls extends downwardly from a top edge of the support wedge.

9. The product assembly of claim 1, wherein a length of each of the two internal walls is slightly smaller than a length of each of the two sidewalls.

10. The product assembly of claim 1, further comprising a connector formed separately from the support wedge and coupling the two internal walls to one another such that the slot remains substantially equal to or less than a predetermined width.

11. The product assembly of claim 10, wherein each of the two internal walls defines an aperture in a lower corner thereof, and the connector extends through the apertures of the two internal walls.

12. The product assembly of claim 1, the support wedge further comprising:

feet extending from each of the two sidewalls below a bottom surface of the base.

13. The product assembly of claim 12, wherein each of the feet is substantially coplanar with respect to a corresponding one of the two sidewalls from which the respective one of the feet extends.

14. The product assembly of claim 1, wherein a transparent wrap extends entirely around each of the substantially planar product and the support wedge.

15. The product assembly of claim 1, wherein the support wedge is formed entirely from a planar blank of corrugated cardboard.

16. A support for a substantially planar product, the support comprising:

supporting means for supporting said substantially planar product, said supporting means comprising a body with a triangular prismatic shape including a substantially planar bottom surface and two opposite sides;

holding means for holding said substantially planar product, said holding means comprising a rectangular cavity extending downwardly from a top edge of the body into an interior of the body, wherein the rectangular cavity is configured to receive a bottom portion of the substantially planar product; and stabilizing means for stabilizing the body on a horizontal surface, the means for stabilizing extending downwardly from each of the two opposite sides beyond the substantially planar bottom surface.

17. The support of claim 16, wherein the two opposite sides each extend from the substantially planar bottom surface and converge toward each other as the opposite sides extend away from the substantially planar bottom surface, and the means for stabilizing includes a first member that is substantially coplanar with one of the two opposite sides and a second member that is substantially coplanar with a different one of the two opposite sides.

18. The support of claim 17, wherein the rectangular cavity substantially extends along an entire length of the body, and the support further comprises:

at least two parallel, planar walls positioned within the body and defining opposite sides of the cavity.

19. The support of claim 18, wherein the rectangular cavity is sized to receive the substantially planar product, and the support further comprises:

means for providing compressive pressure to opposing sides of the substantially planar product to pinch the substantially planar product within the rectangular cavity.

20. A method of displaying a planar retail product, the method comprising:

providing a horizontal support surface;

providing a product support assembly including:

the planar retail product; and a support body formed entirely separate from the planar retail product, the support body including:

a bottom panel laterally extending from a first longitudinal fold line to a second longitudinal fold line opposite the first longitudinal fold line;

a first side panel extending from the first longitudinal fold line to define a third longitudinal fold line opposite the first longitudinal fold line, a second side panel extending from the second longitudinal fold line to define a fourth longitudinal fold line opposite the second longitudinal fold line, the fourth longitudinal fold line being opposite the second longitudinal fold line, the first side panel and the second side panel each extending upwardly and converging toward one another away from bottom panel, a first internal wall downwardly extending from the third longitudinal fold line to the bottom panel, and a second internal wall downwardly extending from the fourth longitudinal fold line to the bottom panel, wherein the first internal wall is spaced from the second internal wall to define a cavity therebetween, wherein a lower portion of the planar retail product is positioned within the cavity; and placing the support body on the horizontal support surface so the bottom panel sits over and extends substantially parallel to the horizontal support surface, and the planar retail product extends vertically from the bottom panel.

21. A method of displaying a planar retail product, the method comprising:

providing a horizontal support surface;

providing a product support assembly including:

the planar retail product; and a support body formed entirely separate from the planar retail product, the support body including:

a bottom panel laterally extending from a first longitudinal fold line to a second longitudinal fold line opposite the first longitudinal fold line;

a first side panel extending from the first longitudinal fold line to define a third longitudinal fold line opposite the first longitudinal fold line, a second side panel extending from the second longitudinal fold line to define a fourth longitudinal fold line opposite the second longitudinal fold line, the fourth longitudinal fold line being opposite the second longitudinal fold line, the first side panel and the second side panel each extending upwardly and converging toward one another away from bottom panel, a first internal wall downwardly extending from the third longitudinal fold line to the bottom panel, and a second internal wall downwardly extending from the fourth longitudinal fold line to the bottom panel, wherein the first internal wall is spaced from the second internal wall to define a cavity therebetween, wherein:

a lower portion of the planar retail product is positioned within the cavity, placing the support body on the horizontal support surface so the bottom panel sits over and extends substantially parallel to the horizontal support surface, and the planar retail product extends vertically from the bottom panel, the support body defines feet extending from each of the first side panel and the second side panel in a substantially coplanar manner to a position slightly below the bottom panel, and placing the support body on the horizontal surface includes positioning the feet to interact with the support surface such that the feet are configured to stabilize the product support assembly on the horizontal support surface.

22. The method of claim 20, wherein the cavity is a substantially rectangular cavity and extends substantially along the entire length of the support body, wherein the planar retail product is formed separately from the support body.

* * * * *